(12) United States Patent
Patapoutian et al.

(10) Patent No.: US 9,244,766 B2
(45) Date of Patent: Jan. 26, 2016

(54) VARIABLE DATA RECOVERY SCHEME HIERARCHY

(71) Applicant: Seagate Technology LLC, Cupertino, CA (US)

(72) Inventors: Ara Patapoutian, Hopkinton, MA (US); Bruce Douglas Buch, Westborough, MA (US); Ryan James Goss, Prior Lake, MN (US); Mark Allen Gaertner, Vadnais Heights, MN (US); Arvind Sridharan, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 96 days.

(21) Appl. No.: 14/034,251

(22) Filed: Sep. 23, 2013

(65) Prior Publication Data

US 2015/0089278 A1 Mar. 26, 2015

(51) Int. Cl.
*G06F 11/10* (2006.01)

(52) U.S. Cl.
CPC .................................. *G06F 11/1048* (2013.01)

(58) Field of Classification Search
CPC ............ G06F 11/1008; G06F 11/1076; G06F 11/1068; G06F 11/1072; G06F 11/10; G06F 11/2094; G06F 11/201; G06F 11/2058; G06F 11/2069; G06F 11/2071; G06F 11/2097; G06F 11/1092
See application file for complete search history.

(56) References Cited

U.S. PATENT DOCUMENTS

| | | | |
|---|---|---|---|
| 5,721,816 A * | 2/1998 | Kusbel et al. | 714/15 |
| 6,018,432 A * | 1/2000 | Ukani | 360/69 |
| 6,038,679 A * | 3/2000 | Hanson | 714/5.1 |
| 6,043,946 A * | 3/2000 | Genheimer et al. | 360/53 |
| 6,606,210 B1 * | 8/2003 | Coker et al. | 360/53 |
| 7,490,261 B2 * | 2/2009 | Gaertner et al. | 714/6.13 |
| 8,327,224 B2 * | 12/2012 | Larsen et al. | 714/763 |
| 8,589,724 B2 * | 11/2013 | Gaertner et al. | 714/6.22 |
| 8,934,301 B2 * | 1/2015 | Yun | 365/185.09 |
| 2007/0053094 A1 * | 3/2007 | Kitamura et al. | 360/53 |
| 2014/0143630 A1 * | 5/2014 | Mu et al. | 714/763 |

* cited by examiner

*Primary Examiner* — Nadeem Iqbal
(74) *Attorney, Agent, or Firm* — Hall Estill Attorneys at Law (57) ABSTRACT

Method and apparatus for managing data in a memory, such as a flash memory. In accordance with some embodiments, a memory has a plurality of solid-state non-volatile memory cells. A processing circuit is connected to the memory and configured to direct the execution of a plurality of read error recovery routines in response to at least one uncorrectable read error in a data set retrieved from the memory. The recovery routines are executed in a selected order based on an elapsed recovery time parameter for each of the recovery routines and an estimated probability of success of each of the recovery routines.

20 Claims, 7 Drawing Sheets

| RECOVERY ROUTINE | AVG TIME IF SUCCESSFUL | AVG TIME IF FAILURE | COND PROB OF SUCCESS | SCHEDULE PRIORITY (SP) |
|---|---|---|---|---|
| 2 READ RETRIES | 0.2 | 0.3 | 0.5 | 0.5 |
| SOFT DECODE | 0.4 | 0.4 | 0.5 | 0.8 |
| 25 READ RETRIES | 2 | 5 | 0.5 | 4.8 |
| OUTER CODE | 5 | 5 | ~1 | 5 |
| VERY LONG TERM RECOVERY (VLTR) | 3 | 17 | 0.5 | 20 |
| LDPC w/ MAX ITERATIONS | 13 | 25 | 0.5 | 38 |

OPTION (A) (PROBABILITY, TIME)

ESTIMATED AVERAGE
RECOVERY TIME: 3.25 ms

FIG. 10A

OPTION (B)

ESTIMATED AVERAGE
RECOVERY TIME: 2.02 ms

FIG. 10B

OPTION (C)

ESTIMATED AVERAGE
RECOVERY TIME: 2.73 ms

FIG. 10C

OPTION (D)

ESTIMATED AVERAGE
RECOVERY TIME: 1.24 ms

FIG. 10D

| SCRIPT | AVERAGE RECOVERY TIME | MINIMUM RECOVERY TIME | MAXIMUM RECOVERY TIME | SUCCESSFUL RECOVERY 75% OF THE TIME? |
|---|---|---|---|---|
| OPTION A | 3.25 ms | 1.6 ms (75%) | 8.2 ms (25%) | 1.6 ms |
| OPTION B | 2.02 ms | 0.4 ms (50%) | 8.6 ms (12.5%) | 2.0 ms |
| OPTION C | 2.73 ms | 1.6 ms (75%) | 8.6 ms (12.5%) | 1.6 ms |
| OPTION D | 1.24 ms | 0.2 ms (50%) | 8.86 ms (6.25%) | 0.6 ms |
| OPTION E | 1.84 ms | 0.2 ms (50%) | 8.86 ms (6.25%) | 2.06 ms |

| | 11 | 01 | 00 | 10 |
|---|---|---|---|---|
| 11 | - | X | Y | Z |
| 01 | X | - | X | Y |
| 00 | Y | X | - | X |
| 10 | Z | Y | X | - |

190 — PROGRAM (columns) / READ (rows)

VARIABLE DATA RECOVERY SCHEME HIERARCHY

SUMMARY

Various embodiments of the present disclosure are generally directed to the management of data in a memory, such as but not limited to a flash memory.

In accordance with some embodiments, a memory has a plurality of solid-state non-volatile memory cells. A processing circuit connected to the memory is configured to direct the execution of a plurality of read error recovery routines in response to at least one uncorrectable read error in a data set retrieved from the memory. The recovery routines are executed in a selected order based on an elapsed recovery time parameter for each of the recovery routines and an estimated probability of success of each of the recovery routines.

These and other features which may characterize various embodiments can be understood in view of the following detailed discussion and the accompanying drawings.

DETAILED DESCRIPTION

The present disclosure generally relates to managing data stored in a memory module, such as but not limited to a flash memory of a data storage device.

A wide variety of data storage memories are known in the art. Some memories are formed from solid-state memory cells which store data in relation to an amount of accumulated charge on a floating gate structure, such as with flash memory. An erasure operation is generally required before new data can be written to a given flash memory location.

Data can be written to a flash memory in the form of pages, which represent a fixed amount of data such as 8192 bytes (B). Usually, an entire page's worth of data is written at a time. The flash memory cells may be configured as single-level cells (SLCs) so that each cell stores a single bit (e.g., a logical 0 or 1), or as multi-level cells (MLCs) so that each cell stores multiple bits (two bits or more). MLCs store different data page across the same group (e.g., row) of cells.

Flash memory cells are often configured to store user data and corresponding parity data. The parity data (e.g., error correction codes, ECC) are used to correct read errors encountered in the user data payload during a read operation. Read error recovery operations may be employed in an effort to recover from an uncorrectable read error experienced during a read operation.

Accordingly, various embodiments of the present disclosure are generally directed to an apparatus and method for managing data in a memory, such as but not necessarily limited to a flash memory. As explained below, a plurality of read error recovery operations are defined and made available for use in correcting uncorrectable errors experienced during normal read operations. Data statistics are accumulated for each of the different types of read error recovery operations. The types of statistics can vary depending on the requirements of a given application, but such statistics can include average time consumed when using each of the error recovery operations, the time required when the error recovery operations are successful versus not successful, the estimated or observed probability of success for each type of error recovery operation, etc.

From these and other factors, a rate of return (ROR) value can be generated for each type of error recovery operation. Generally, a lower ROR value indicates a higher estimated effectiveness of the error recovery operation, and a higher ROR value indicates a lower estimated effectiveness of the error recovery operation. The "effectiveness" can be expressed in a variety of ways including probability of success, elapsed time to complete, suitability for a given operational environment or existing system parameters (e.g., observed or measured bit error rates, BERs, page location, etc.).

In some cases, the error recovery routines are ordered in a correction table in relation to the ROR values (e.g., from best to worst). Thereafter, when an uncorrectable error is encountered during a read operation, the read error recovery operations are applied in an order corresponding to the correaction table.

In further cases, an initial ordering of the recovery routines is provided within a correction table and statistical data are subsequently obtained during device operation. The ROR values are updated and, as necessary, the read error recovery operations are rearranged into a different, more effective order in the table.

In still further cases, a "global" correction table may be organized for "normal" error correction efforts. One or more "local" correction tables may additionally be organized for special conditions, such as different operational workloads. Some of the error recovery operations may be automatically attempted in response to an uncorrectable read error, followed by the manual application of additional error recovery operations if the automatic operations are unsuccessful.

An optimum error recovery scheme at any given time can be selected based on a variety of factors such as contention, resource bottlenecks, starvation, scheduling rules, and general quality of service (QoS) parameters. In some cases, such as during media streaming, the best choice may be to not perform any additional correction and return the failed data to a requesting host.

The use of two or more available correction table scripts allows for a minimal set of configuration information to be maintained and communicated within the system. For example, if the global table is adequate to provide recovery in a given case, additional local table communications may be unnecessary, thereby saving command overhead and other resources.

Figure 1:
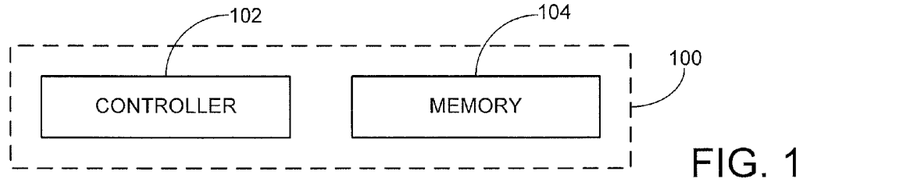
FIG. 1 provides a functional block representation of a data storage device in accordance with various embodiments.

These and other features of various embodiments can be understood beginning with a review of FIG. 1 which provides a simplified block diagram of a data storage device 100. The data storage device 100 includes two main modules: a controller 102 and a solid-state memory module 104. The controller 102 may be a hardware-based or programmable processor with associated memory. The memory module 104 may take a variety of forms and generally constitutes a solid-state non-volatile memory with associated control electronics.

For purposes of providing a concrete example, the device 100 will be contemplated as comprising a solid state drive (SSD) and the memory module 104 will comprise a flash memory device. Other configurations can be used, including configurations that incorporate the controller and memory module functions into a single integrated circuit as a system on chip, SOC.

Figure 2:
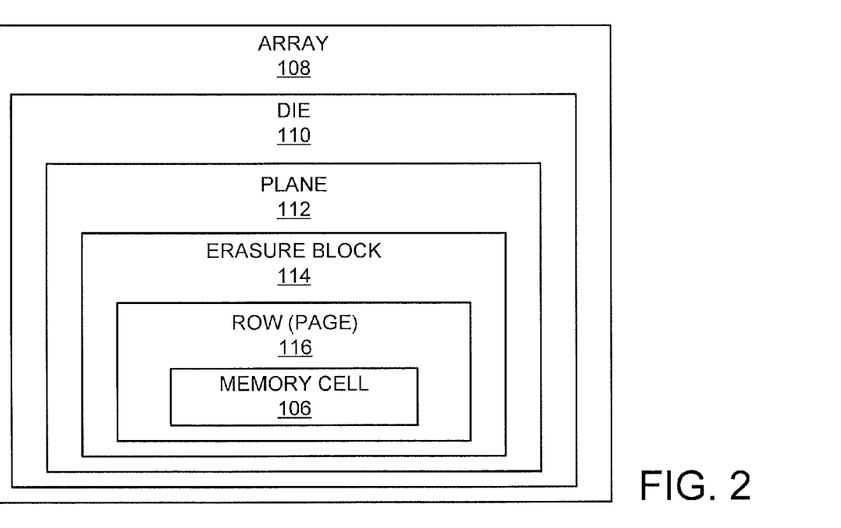
FIG. 2 is a schematic depiction of the memory module of FIG. 1 as a flash memory in accordance with some embodiments.

The flash memory of the memory module 104 is formed from a population of flash memory cells 106 that are arranged as shown in FIG. 2. The memory module 104 includes one or more arrays 108 of memory cells. Each array 108 incorporates one or more dies 110, which are physically distinct semiconductor wafers or chips. Each die 110 includes a number of planes 112, with each plane having the capability of executing a corresponding access (e.g., program, read, erase) operation. An example configuration is four planes per die and for dies per array, although other arrangements can be used.

Each plane 112 groups the memory cells 106 into erasure blocks 114, which represent the smallest grouping of cells that can be concurrently subjected to an erasure operation. Each erasure block 114 is formed of a plurality of rows (pages) 116 of memory the cells 106.

Figure 3:
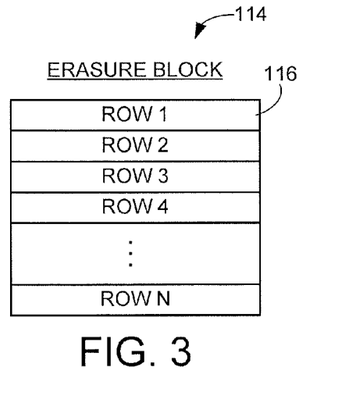
FIG. 3 illustrates an exemplary format for an erasure block of the flash memory.

FIG. 3 illustrates an example erasure block 114 with N rows 116. An example configuration for the erasure block 114 is a row count of 128 (N=128), with each row having 65,536 cells to provide a per-page data capacity size of 8192 B (65,536/8=8192). Other numbers and lengths of rows can be used.

Figure 4:
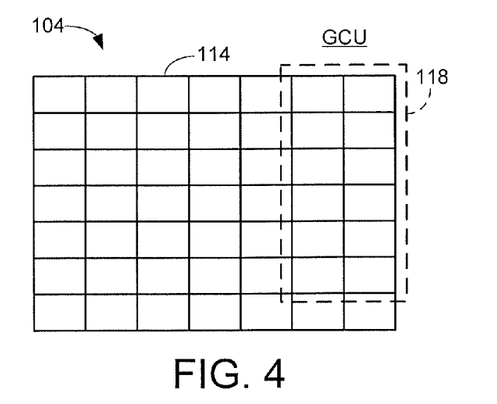
FIG. 4 illustrates a number of erasure blocks arranged into garbage collection units (GCUs).

FIG. 4 shows erasure blocks 114 arranged into garbage collection units (GCUs) 118 which are allocated and erased as a unit. The GCUs may extend across multiple planes. The GCUs are managed using garbage collection operations. After a set of data has been written to a group of flash memory cells 106, the group of cells generally requires an erasure operation to reset the cells before new data can be written thereto. If data associated with a particular logical address, such as a logical block address (LBA) are written to the flash memory 104, and an updated version of the same data are subsequently presented for storage to the memory, the new data (LBA) will be written to a new location and the older version of the data will be marked as stale.

Thus, once a sufficient amount of data in a given GCU 118 are marked as stale, a garbage collection operation will be scheduled during which the remaining current data in the GCU 118 are copied to a new location, the entire GCU is subjected to an erasure operation, and the GCU is returned to an available allocation pool. Wear leveling techniques may be carried out in an effort to maintain all of the GCUs 118 in the memory 104 with a substantially similar number of program/erase (PE) cycles.

The data along each row 116 can be written using single level cells (SLCs), in which case a single page of data is written to the row, or multi-level cells (MLCs), in which multiple pages of data, such as two pages of data, are written to each row. Generally, $2^N$ storage stages can be used to represent N bits of data (e.g., $2^2$=4 storage states can be used to store two bits). When two bits are stored by each cell, the least significant bits (LSB) can represent bit values for a first page of data and the most significant bits (MSB) can represent bit values for a second page of data.

Figure 5:
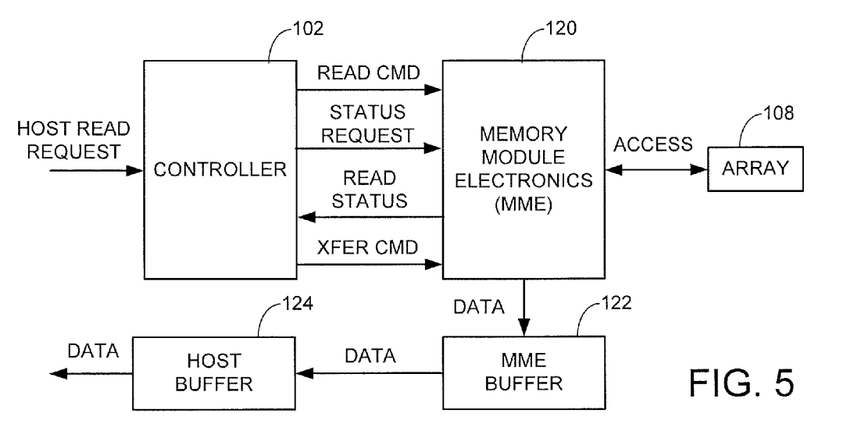
FIG. 5 illustrates operation of the device of FIG. 1 during a read operation.

FIG. 5 is a functional block representation of relevant portions of the storage device 100 of FIG. 1 to service a host read request in accordance with some embodiments. FIG. 5 shows the controller 102 in communication with memory module electronics (MME) 120. The MME 120 includes read/write/erase (R/W/E) circuitry and other control circuitry incorporated into the flash memory module 104. The MME 120 can have a relatively small, local MME data buffer 122. A relatively large host buffer 124 associated with the controller 102 can buffer data pending transfers with a host device.

While not limiting, it will be recognized by those skilled in the art that current generation SSDs and other data storage device systems can be formed from integrated memory modules such as 104 that are commercially available from a source of such devices. The memory modules are integrated into an SSD by a device manufacturer which supplies the controller functions such as 102 and tailors the controller to operate with the memory module. The controller and memory module are thus separate operational entities which communicate across one or more defined data and command interfaces. A "pull" system is commonly used in which the controller 102 issues commands and then repetitively checks the status of those commands by the memory module 104 to determine whether the commands have been completed.

For example, when reading data from the memory 104, the controller 102 can issue a read command with a format that identifies the requested data to be returned from the memory to the controller, for subsequent transfer to an external host device coupled to the SSD 100. The MME 120 schedules and executes the read command and places the retrieved data into the local MME buffer 122. The controller 102 subsequently issues one or more status requests, such as read enhanced status (RES) commands, which request a status associated with the retrieved data. The MME 120 supplies a read status in response to each status request.

If the MME 120 has not yet completed the data read operation, the MME 120 may signal a "command still pending" read status. Once the data read operation is completed, the MME signals a "ready to transfer" read status, which indicates the retrieved data are pending in the MME buffer 122 and ready for transfer to the host buffer 124. The controller 102 subsequently issues a transfer (XFER) command to transfer the data from the MME buffer 122 to the host buffer 124, after which the data are transferred to the requesting host device.

It is contemplated that the recovered data placed into the MME buffer 122 will be subjected to the application of parity (ECC) data to detect and correct bit errors in the readback data, so that under normal conditions the recovered data will be error free prior to being transferred to the host buffer 124. However, in some cases, the read operation carried out by the MME 120 may produce a set of readback data having one or more read errors that cannot be satisfactorily resolved by the MME using the corresponding ECC data ("uncorrectable errors").

Figure 6:
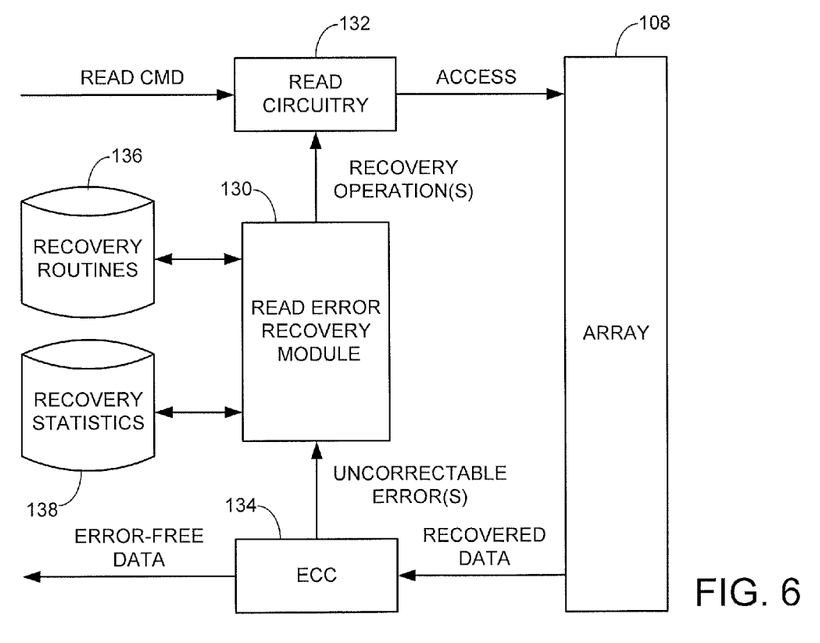
FIG. 6 shows a read error recovery module operative to provide dynamic read error recovery operations in accordance with some embodiments.

Accordingly, FIG. 6 is a functional block representation of further aspects of the device 100 in accordance with some embodiments. The circuitry includes a read error recovery module 130 which, as explained below, operates in response to the presence of one or more uncorrectable read errors in a readback data set. It is contemplated that the read error recovery module 130 will be incorporated as a portion of the functionality of the controller 102, although such is merely exemplary and is not limiting. In other embodiments, some or all of the read error recovery module 130 is implemented as part of the MME 120 or other portion of the device 100.

During a read operation the controller 102 issues a read command to the MME 120. As shown in FIG. 6, this command is decoded by read circuitry 132 of the MME 120 to identify the requested data. This may include physical address parameters (e.g., array, die, plane, GC, erasure block, row, page, bit offset, etc. as discussed above in FIGS. 2-4). The read command may include other parameters as well. Although not shown in FIG. 6, control data such as metadata may be retrieved and used to prepare the system for the read access operation.

In response to the decoded information from the read command, the read circuitry 132 applies the appropriate signals to various control lines coupled to the appropriate array(s) 108 and senses back a recovered data set. Error correction is applied to the recovered data set, as represented by ECC block 134, in an attempt to detect and correct any bit errors in the recovered data. As noted above, if no errors are detected, or if errors are detected but all such errors are corrected, corrected (error-free) data are output to the MME buffer 122 (FIG. 5) pending transfer to the host buffer 124.

At such time that the recovered data have at least one uncorrectable read error, the read error recovery module 130 implements one or more recovery operations in an effort to resolve the uncorrectable error(s). The read error recovery module 130 may utilize a data structure, such as one or more tables, in a memory 136 that provides a listing of available recovery routines. The read error recovery module 130 may further utilize and/or update recovery statistics associated with the various recovery routines in a memory 138.

Figure 7:
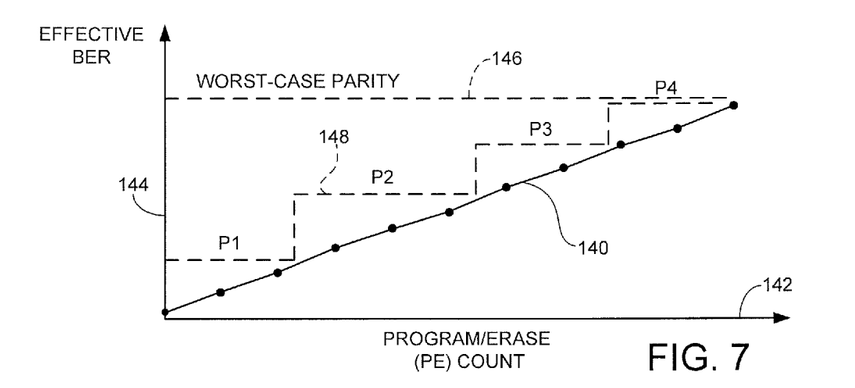
FIG. 7 graphically illustrates bit error rate (BER) and parity (error correction code, ECC) levels over an operational life of the device of FIG. 1.

Before examining the various types of read error recovery routines that may be made available to and used by the read error recovery module 130, reference is made to FIG. 7 which provides a graphical representation of an example bit error rate (BER) curve 140 for the device 100. The BER curve 140 generally indicates the average bit error rate expected to be exhibited by the memory module 104 over the life of the device 100. The curve 140 is shown to be substantially linear, although other shapes may be encountered. The curve 140 can be generated by monitoring, over time, the effective BER of the flash memory device by location.

The BER curve 140 is plotted against a program/erase (PE) count x-axis 142 and an effective BER y-axis 144. The PE count generally represents an accumulated count of PE (access) operations upon a selected memory location (e.g., a row 114, FIG. 3) of the flash memory module 104. The memory module 104 may have a specified life, such as around 35,000 PE operations, and the curve in FIG. 7 may extend to this level or may extend beyond it. The effective BER indicates the BER rate with the application of the parity data to the user data payloads at the respective locations.

A worst-case parity level is represented by dashed line 146 and generally represents a fixed-strength ECC capability of the system. Line 146 thus describes a scheme in which parity (ECC) data are provided for each user data payload to correct normal bit errors, and the ECC strength of the data is selected to meet the worst-case levels experienced near the end of the operational life of the system. One example implementation of parity level 146 is the use of specially configured rows (FIG. 3) with a first number of available memory cells to store the user data (e.g., 8192 bytes, etc.) and a second number of available memory cells configured to store the parity data (e.g., 1024 bytes, etc.). This scheme generally ensures that the available ECC strength of the parity data will be sufficient under normal operating conditions to accommodate normal levels of bit errors in the readback data.

In other embodiments, a tailored ECC strength approach can be used as represented by parity data curve 148. The curve 148 operates as a step-function to provide different parity levels (e.g., P1-P4) at different times during the operational life of the device. Generally, P1 is a lower strength ECC suitable for early life BER levels, P2 is a higher strength ECC suitable for use once P1 is no longer able to satisfactorily correct the read errors in the data, and so on.

The successive parity levels can be switched in and used as the memory module ages. The first parity P1 may be, for example, a low strength ECC scheme such as a BCH code. This continues to be used until an increase in the observed effective BER warrants a stepwise increase in ECC strength, as denoted by the switch to P2, which may use a relatively stronger LDPC code, etc. Any suitable parity profile can be used.

The distance between the step-function curve 148 and the substantially linear BER curve 140 at any point shows potential gains in overprovisioning of error correction capability by the system. Reducing this distance will tend to improve performance by providing error correction capabilities suitable for the then-existing BER performance of the system. This will also increase the then-available amount of memory for the storage of user data.

By contrast, the significant distance between the worst-case line 146 and the curve 148 shows that, for most of the operational life of the device, using a worst-case ECC scheme will provide significant margin and extra correction capability which may be significantly more than strictly necessary to meet the required BER levels, at the cost of additional processing overhead and data storage capacity reduction to accommodate the parity data footprint (instead of user data).

On the other hand, it will be observed that tailoring the parity levels to the then-existing wear/BER levels, as provided by curve 148, may increase the likelihood that uncorrectable errors may arise under certain circumstances. That is, the BER curve 140 represents the "normal" bit error rates experienced by the system. A number of factors, including read disturb effects, write disturb effects, voltage fluctuations, temperature, age, charge drift, manufacturing variations, electrical offsets, write errors, etc. can cause any particular data set at any given time to experience a greater than expected number of errors during a read operation. If the total number of errors exceed the correction capabilities of the normally-applied parity level (e.g., curve 146 or 148), one or more uncorrectable errors will result.

Figure 8:
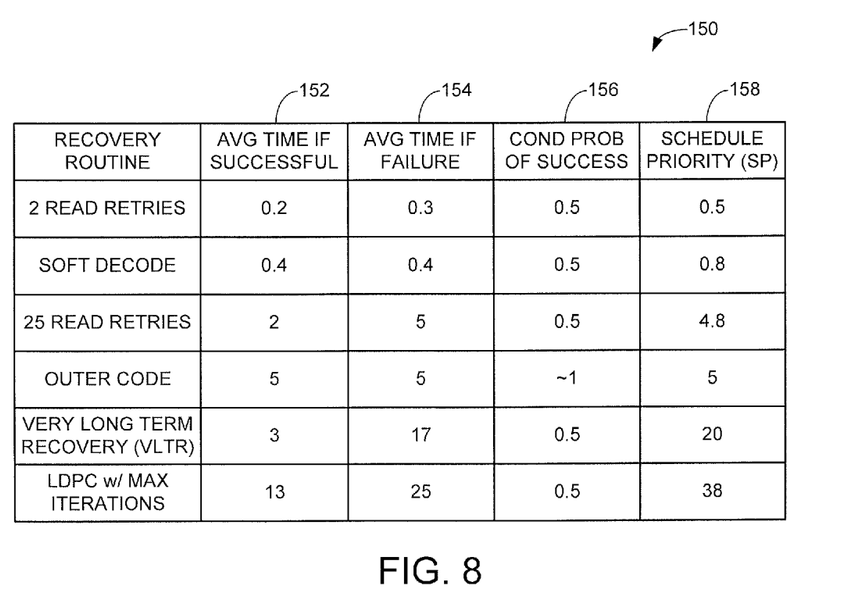
FIG. 8 provides an illustrative table of different error recovery routines with associated elapsed times and probabilities of success.

The read error recovery module 130 of FIG. 6 thus operates at such times that a higher than normal number of errors are experienced by the system. FIG. 8 provides a table structure 150 of a number of available read error recovery routines. These routines are merely exemplary as any number of different types of routines can be used as desired. Although the routine labels are largely self-explanatory, a brief explanation of each of the routines will be provided for clarity.

The "2 read retries" routine will be recognized as comprising the re-reading of the data twice in succession. While two (2) retries are listed, other numbers can be used including greater than or less than two retries. It will be recognized that for spurious read errors caused by transitory effects, the 2 read retries may in many cases result in the successful recovery of the data from the associated memory location. The retries may be carried out using different read parameters, such as different voltage thresholds.

The "soft decode" routine can take a variety of forms but generally involves the application of adjusted read voltage thresholds to the memory cells at the selected location, including stepwise adjustments in read thresholds, in an effort to decode the data. For example, instead of applying a particular voltage sense threshold of X volts to detect the programmed state of a cell, one or more adjusted voltage levels (e.g., X±Y volts) may be applied to the cells to better determine the programmed states. In some cases, soft decode operations may be similar to read retries, but in a read retry each block of data may be decoded separately whereas with a soft decode all reads may be first combined into a set of "soft data" and then decoded at once.

The "25 read retries" will be understood as simply 25 read operations carried out in a row. In some cases, voting or other techniques can be applied during this extended read retry operation to achieve a selected confidence level. Large numbers of retries can detect which bits are apt to change from one read to the next versus other bits that tend to stay the same, allowing further analysis into which bits are subject to the error condition and may be contributing to the total number of errors.

An "Outer Codes" routine is similar to that described above, and generally involves the use of an outercode layer of parity bits, Hamming codes, exclusive-or (XOR), Reed Solomon codes, etc. to test for failed bits. Outer Code routines may also involve multiple reads and comparisons of the readback data. A single outercode layer may be applied to multiple pages, planes, dies and/or chips and may operate to recover failed pages by regenerating them from other successfully decoded pages in the same outercode layer.

A "Very Long Term Recovery (VLTR)" routine is included in the table structure 150 of FIG. 8. This can take a variety of forms, and is intended to describe techniques used in an effort to resolve uncorrectable bit errors. In some cases, various techniques listed above can be combined, including different threshold voltages, voting, XOR processing, iterations, etc. As used herein, VLTR processing will be generally viewed as among the longest, and slowest, form of error recovery and therefore (at least in many cases) not a good candidate for the "first" routine applied at the beginning of the error recovery processing effort.

Finally, the "LDPC with Maximum Iterations" routine uses low density parity codes (LDPC) to detect and correct errors. As will be recognized, LDPC are a class of parity codes that are iterative in nature; usually some upper level number of iterations (such as 12, 20, etc.) can be carried out to converge to to a final set of bits. It will be appreciated that if the number of bit errors is excessive, no convergence may occur. Hence, some upper limit is specified on the number of iterations. The general idea is that, once the maximum number of iterations has been achieved, either the final result will have been obtained, or no result is likely to ever be obtained no matter how many additional iterations are provided.

As noted above, these various error recovery routines are merely examples. Many other types of error recovery routines may occur to the skilled artisan in view of the present disclosure, and such can be readily incorporated into the table. The types of errors, memory, operational conditions, etc. can play a role in which routines are selected. In some cases, a larger library of available routines may be accumulated and a subset of the routines is incorporated into a table structure such as FIG. 8 at a given time.

The table structure 150 includes a number of data values corresponding to the various types of error recovery routines. These data points are merely exemplary and may be obtained through empirical measurements and/or calculations. In some cases, the data values are updated over the operational life of the device based on the then-existing observed performance of the various devices.

The table structure 150 is provided with a first column 152 which provides an average time, in milliseconds (ms), to perform each routine in the situation where the routine successfully resolves the read error. For example, the "2 read retries" entry requires, on average, about 0.2 ms to perform if the entry resolves a given set of errors (e.g., corrects all the uncorrectable errors in the data set). It can be seen that the 2 read retries is the fastest routine to successfully complete, and the LDPC (with maximum iterations) entry is the slowest routine to successfully complete.

A second column 154 provides average times, in ms, to complete the various recovery routines in those cases where the recovery routines are unsuccessful in resolving all of the uncorrectable errors in the readback data set. As before, the 2 read retries is the fastest (about 0.3 ms) and the LDPC routine is the slowest (about 25 ms). For reference, each of the values in the first and second columns 152, 154 may be characterized as an elapsed recovery time parameter for each of the recovery routines. Other types of elapsed recovery time parameters may be formulated as required.

A third column 156 provides a conditional probability of success for each of the entries. The probabilities may be estimated values or may be initially estimated and a convergence function is used to allow the values to change in a controlled fashion over time based on actual performance. It can be seen that most of the routines have an estimated probability of success of about 0.5, which means that, on average, each of the routines have a likelihood of success of about 50%. This is merely exemplary and is not limiting.

By contrast, the Outer Code routine has a probability of about one (~1), which means that in most cases, the Outer Code routine can successfully correct the uncorrectable errors (at least within certain bounds). In some cases, the Outer Code routine may employ outercode or other parity data that requires a relatively large processing overhead to crunch through the processing irrespective of success or failure (note that time to failure and time to success values are both about 5 ms in the table).

A fourth column 158 in the table 150 provides a schedule priority (SP) metric. This metric is derived from the other values in the table, and generally represents an ordering measure in terms of which routine should be used when. As can be seen, the entries in the table structure 150 are ordered from smallest to largest. The SP provides a rate of return (ROR) measure with regard to the associated read error recovery routine.

In some embodiments, the SP value can be derived using the following relation:

$$SP = \left(\frac{T_F}{P}\right) - (T_F - T_S) \tag{1}$$

where $T_F$ is the average time if failure (column 154), P is the conditional probability of success (column 156), and $T_S$ is the average time if successful (column 152). Other formulations for the ROR value can be used, including formulations that use less than all of the factors in Table 8, formulations that utilize additional factors, etc.

Figure 9:
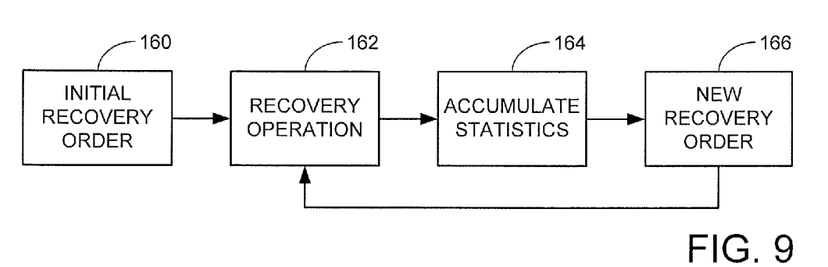
FIG. 9 is a read error recovery sequence used by the read error recovery module of FIG. 6.

FIG. 9 provides a sequence carried out by the read error recovery module 130 of FIG. 6 during successive read operations. A data structure such as the data structure 150 in FIG. 8 is initially formed at block 160 by the read error recovery module 130 using the recovery statistics from memory location 138. The data structure is formed by generating the SP values for each entry, ordering the entries in relation to the magnitudes of the SP values, and then storing the ordered table in the memory 136 for future reference.

Thereafter, during a recovery operation in which one or more uncorrectable errors are detected, block 162, the read error recovery module 130 directs the MME 120 (FIG. 5) to carry out the read error recovery routines in the order set forth by the initially ordered table. Once a selected recovery operation is successful, further application of the recovery routines is suspended, and the data are output as described above for transfer to the host device.

Over time, statistics are accumulated, as indicated by block 164, such as the elapsed time to carry out the various routines, the number of times the routines are successful compared to the total number of times the routines are applied (e.g., the conditional probability), etc. In some cases, the relative ordering of the routine during a particular error recovery operation may be weighed into one or more of the accumulated statistics. Finally, as represented by block 166, as required the various SP values are recalculated using the updated statistics, and as required a new reordered table may be generated and thereafter used for future recovery operations.

In this way, the system dynamically selects an optimum order for the error recovery routines based on actual performance, both in terms of elapsed time to complete and observed probability of success.

The data set forth in FIG. 8 provide additional criteria whereby different sets of routines may be evaluated as possible recovery schemes, which as explained below, may result in multiple alternative available recovery scripts that may be applied by the system at different times and under different operational conditions. To this end, FIGS. 10A-10D illustrate four (4) different potential error recovery schemes using various available recovery routines. For clarity, the schemes (scripts) include various recovery routines with associated ordered pairs of values (P, T), with the first value P being the conditional probability of success and the second value T being an elapsed time of success or failure. It will be noted that the example values in FIGS. 10A-10D may not necessarily correspond to the example values that were previously listed in FIG. 8.

Figure 10A:
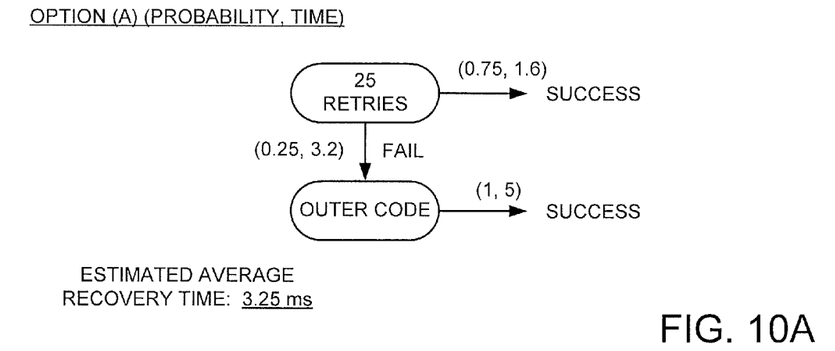
FIGS. 10A-10D show different read error recovery sequence options available to the read error recovery module of FIG. 6.

FIG. 10A provides a first recovery script (Option A) in which two error recovery routines are applied in an effort to resolve the presence of one or more uncorrectable errors in a given data set. The first recovery script applies the 25 retries routine, followed by the Outer Code routine.

As can be seen, the 25 retries routine in FIG. 10A has an expected probability of 0.75, which means that this routine is expected to resolve all of the uncorrected errors about 75% of the time. If successful, this takes place in, on average, about 1.6 ms. If the 25 retries routine is unsuccessful, which is expected to occur about 25% of the time (P=0.25), it will take, on average, about 3.2 ms before the 25 retries are concluded.

It can further be seen in FIG. 10A that the Outer Code routine will almost always work (P=~1), but it will take, on average, about 5 ms to do so.

An estimated average recovery time TR for the two-stage script in FIG. 10A can be generally determined as follows:

$$T_R = (P_S)(T_S) + (P_F)(T_C) \qquad (2)$$

where $P_S$ is the probability of success for the first stage, $T_S$ is the time for successful conclusion of the first stage, $P_F$ is the probability of failure by the first stage, and $T_C$ is the total, cumulative time for the failure of the first stage and the success of the second stage. As shown in FIG. 10A, the total recovery time can be determined as:

$$T_R = (P_S)(T_S) + (P_F)(T_C) = (0.75)(1.6) + (0.25)(3.2+5) = 3.25 \text{ ms} \qquad (3)$$

In other words, an average overall recovery time of 3.25 ms can be achieved by applying the 25 retries followed by the Outer Code routine. The actual results will be bi-modal; three-quarters (75%) of the time the error recovery effort will require only about 1.6 ms to complete, but one-quarter (25%) of the time the error recovery effort will require about 8.2 ms to complete.

Figure 10B:
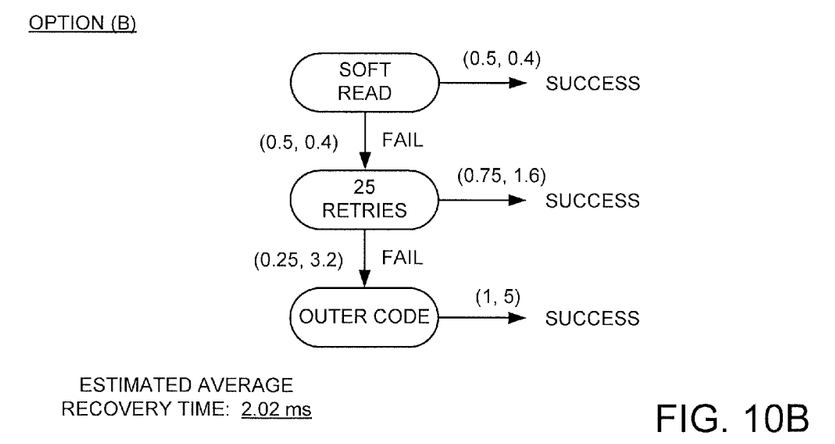

FIG. 10B provides a three routine script (Option B) by inserting a soft read routine prior to the 25 retries and the Outer Code routine of FIG. 10A. The initial soft read routine has an estimated probability of success of 0.5 (50%), and takes 0.4 ms regardless whether the routine is successful or not.

The estimated average recovery time $T_R$ for the three-stage recovery script in FIG. 10B can be given as:

$$T_R = (P_{S1})(T_{S1}) + (P_{F1})(P_{S2})(T_{C12}) + (P_{F1})(P_{F2})(P_{S3})(T_{C123}) \qquad (4)$$

where $P_{S1}$ is the probability of success for the first stage (soft read), $T_{S1}$ is the time to successfully complete the first stage, $P_{F1}$ is the probability of failure of the first stage, $P_{S2}$ is the probability of success of the second stage (25 retries), $T_{C12}$ is the total cumulative time to complete the first and second stages (with success at the second stage), $P_{S3}$ is the probability of success by the third stage (Outer Code), and $T_{C123}$ is the total cumulative time for all three stages (with success at the third stage). Using the values from FIG. 10 provides:

$$T_R = (0.5)(0.4) + (0.5)(0.75)(2.0) + (0.5)(0.25)(1)(8.6) = 2.02 \text{ ms} \qquad (5)$$

Thus, in FIG. 10B the use of the initial soft read recovery stage at the beginning of the script lowers the average recovery time to about 2.02 ms. As before, the actual observed response time will be tri-modal. Half (50%) of the time, successful recovery of the uncorrectable error(s) will be completed in about 0.4 ms. Three-eighths (37.5%) of the time, successful recovery will occur in about 2 ms, and one-eighth (12.5%) of the time, full recovery will require about 8.6 ms.

Figure 10C:
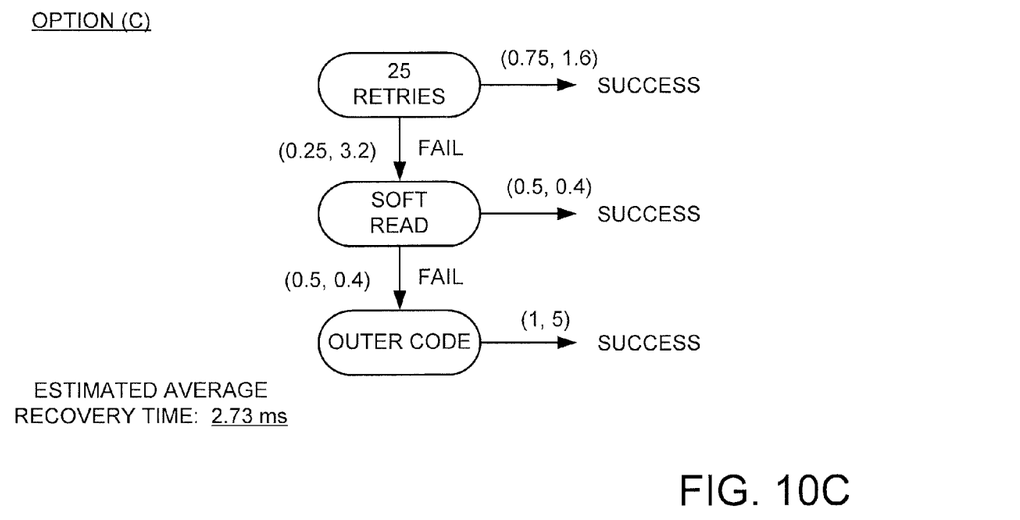

It will be noted that the order of application of the recovery routines can significantly influence the overall recovery time. FIG. 10C (Option C) has been provided to illustrate the use of the same three recovery routines from FIG. 10B, but in a different order. More particularly, FIG. 10C shows the use of the 25 retries first, followed by the soft read and then the Outer Code routine.

Using equation (4) above, the estimated total recovery time TR for the three-stage script of FIG. 10C provides:

$$T_R = (0.75)(1.6) + (0.25)(0.5)(0.4) + (0.25)(0.5)(1)(8.6) = 2.73 \text{ ms} \qquad (6)$$

The script in FIG. 10C requires, on average, about 33% more time than the script in FIG. 10B (2.73 ms v. 2.02 ms). On the other hand, three-quarters (75%) of the time the script in FIG. 10C will be completed in 1.6 ms, which may be adjudged as being more desirable, from a constant data throughput standpoint, than the lower average of the script in FIG. 10B. Both scripts have a worst case scenario of about 8.6 ms if the Outer Code is required to resolve the uncorrected errors, and this will occur in both scripts about 12.5% of the time.

Figure 10D:
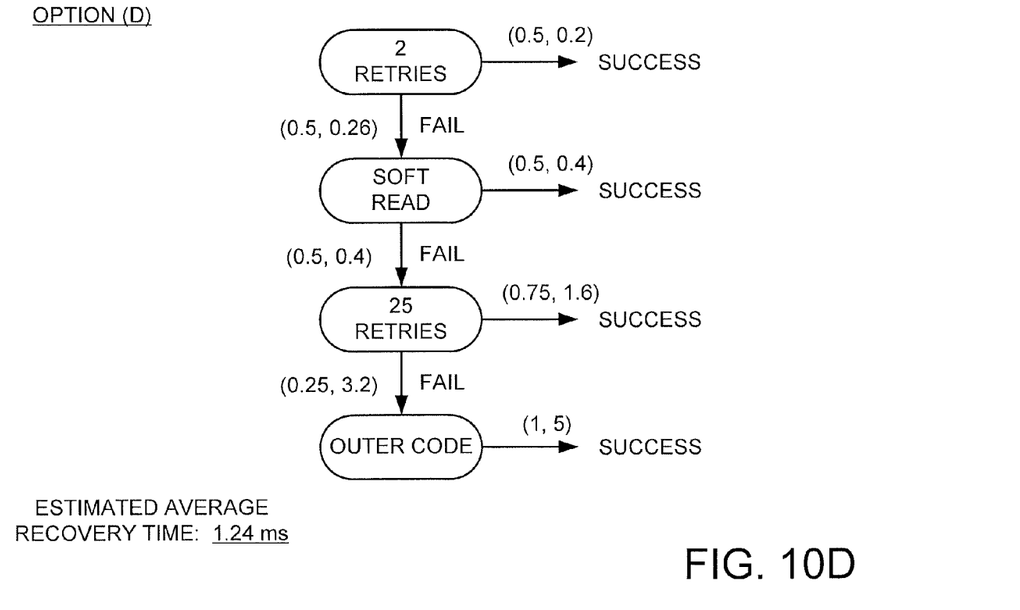

FIG. 10D provides a fourth script (Option D) with four recovery operations. The script in FIG. 10D adds the 2 retries recovery routine to the soft read, 25 retries and Outer Code of FIG. 10B. This provides an average recovery time TR of:

$$T_R=(0.5)(0.2)+(0.5)(0.5)(0.66)+(0.5)(0.5)(0.75)(2.26)+(0.5)(0.5)(0.25)(1)(8.86)=1.24 \text{ ms} \quad (7)$$

Of the four options, Option D in FIG. 10D provides the best overall average recovery time of 1.24 ms, with half (50%) of the time the recovery occurring within about 0.2 ms, and three-quarters (75%) of the time the recovery occurring within about 0.64 ms. Using all four routines extends the overall maximum recovery time to an average of about 8.86 ms, if the Outer Code recovery routine is required. It is estimated, however, that the Outer Code processing will only be needed about one-sixteenth (6.25%) of the time.

Figure 11:
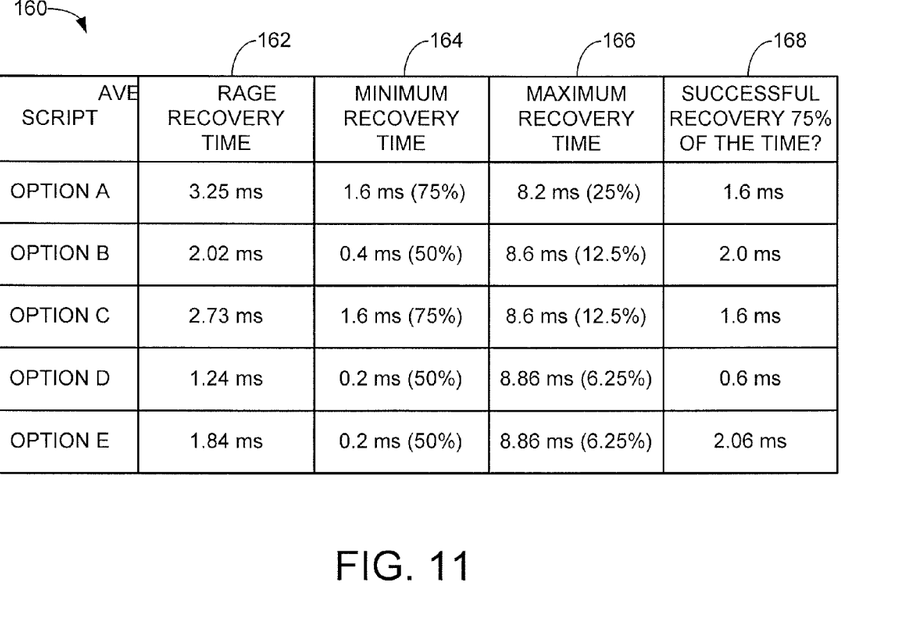
FIG. 11 is a table that summarizes data from FIGS. 10A-10D.

FIG. 11 provides a summary table in tabulated form of the above data values from FIGS. 10A-10D (Options A-D). The table in FIG. 11 shows the average recovery time (column 162), the minimum recovery time (column 164) and the maximum recovery time (column 166). The estimated percentages of time that these minimum and maximum recovery times will be encountered are also shown. Option A, for example, will resolve within 1.6 ms 75% of the time and within 8.2 ms the remaining 25% of the time, and so on. The table in FIG. 11 further indicates the total elapsed time within which each option will successfully resolve the uncorrected errors 75% of the time (column 168).

From Table 11 it can be seen that shorter peak and overall average resolution times can be achieved by using faster to complete routines early in the process, even if such routines have a lower probability of success. It can be seen, for example, that the 2 retries routine is a significantly better choice as the first routine (0.2 ms) as compared to the 25 retries routine (1.6 ms), even though the latter has a significantly higher probability of success (75% v. 50%).

The ordering of the routines using both completion times and probabilities of success lead to improved results. This can be observed comparing Option B, which has an optimum ordering of the SP values from FIG. 8, to Option C, which does not have an optimum ordering of the SP values.

The ordering of the routines was found to be more important than the total number of routines per se. It is true that Option D provides the best performance out of the group, but this is because the routines were ordered in accordance with the SP values, and not merely because Option D has more routines. A fifth option (Option E), formed by adding the 2 retries block as the first routine in the script in FIG. 10C, provides a four-routine script with an average recovery time of about 1.84 ms, but three-quarters (75%) of the time the recovery will require up to about 2.06 ms. This unfavorably compares to Option D where 75% of the time recovery is successfully completed within about 0.6 ms.

Figure 12:
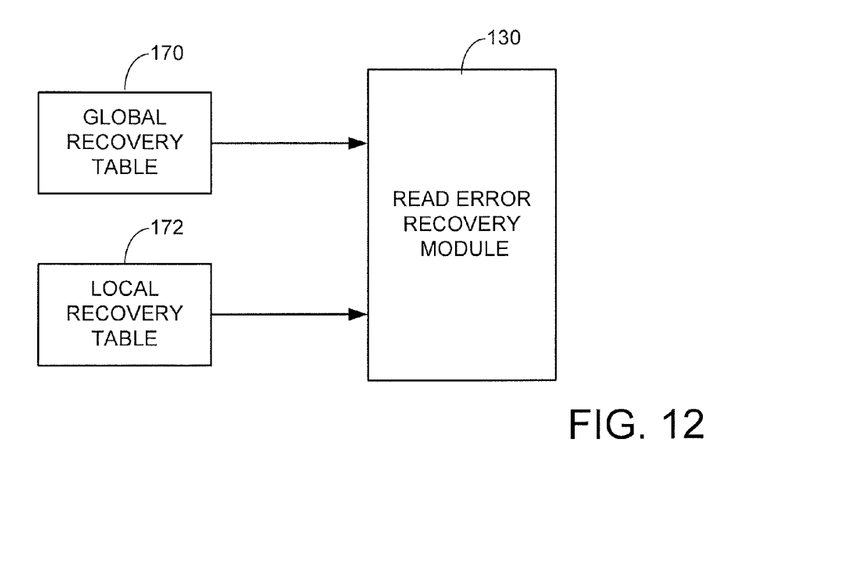
FIG. 12 is another depiction of the read error recovery module in accordance with further embodiments.

FIG. 12 shows the read error recovery module 130 of FIG. 6 in conjunction with multiple recovery tables that can be used during uncorrected error recovery operations. A first recovery table, referred to as a global recovery table 170, provides a first set of recovery operations in a first selected order. A second recovery table, referred to as a local recovery table 172, provides a different second set of recovery operations in a different second selected order.

In some cases, the global recovery table 170 is used as a default setting for normal error recovery operations, and such may be automatically initiated responsive to the declaration of at least one uncorrectable error. Examples may include the 2 read retries and the soft decode routines (see FIG. 8). In some cases, the MME 120 may be configured to automatically execute these and other fast routines with relatively high success rates in an effort to correct the uncorrectable error(s) in a recovered data set. If the global recovery table 170 is unable to clear the error(s), the local recovery table 172 may be implemented, with the local recovery table listing more extensive recovery routines such as the 25 read retries, the Outer Code routine, etc. In this way, the global recovery table is a primary routine script which is always executed and then the local recovery table is a secondary routine script with is executed as needed.

In other cases, the global recovery table 170 can be a default script with a first ordering of recovery routines with both relatively fast and slow response times, and the local recovery table 172 can be an exception script with a second ordering of recovery routines with both relatively fast and slow response times. As before, both tables 170, 172 are ordered as discussed above in FIG. 8, and both tables may include at least some of the same routines. In this approach, the global recovery table 170 may be applied as a default configuration under some operational environments, such as normal processing, and the local recovery table 172 may be applied under other operational environments, such as elevated temperature, different loading requirements, etc. on a command-by-command basis. For example and not by way of limitation, a current operational environment (e.g., streaming v. random; high data I/O v. low data I/O; write heavy v. read heavy, etc.) can be detected and an appropriate table (e.g., 170 or 172) can be applied to best meet the then-existing operational environment.

Figure 13:
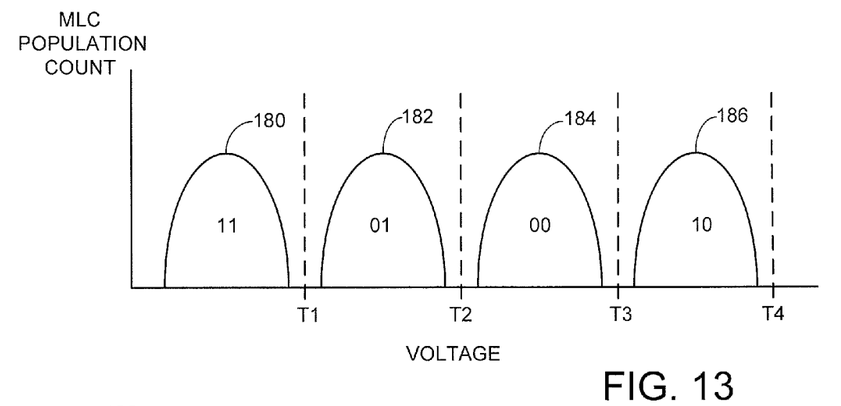
FIG. 13 graphically depicts populations of flash memory cells programmed as multi-level cells (MLCs).

FIG. 13 shows the use of MLC programming cells in a flash array such as 108. In some cases, the bit placement of the data to be recovered may direct the use of different recovery tables. FIG. 13 provides respective populations of memory cells programmed to respective multi-bit states of 11 (population 180), 01 (population 182), 00 (population 184) and 10 (population 186). The different populations have different total amounts of accumulated charge on the respective floating gates of the memory cells. These respective programming states can be sensed through the application of different read sense voltage thresholds T1-T4.

A first page of data may be written to a row of memory cells using single level cell (SLC) programming, so that logical 1's are written so as to fall within the population 170 and logical 0's are written so as to fall within the population 174. A second set of data may be subsequently written to the row of memory cells to convert the cells to MLC form. This writing of the second page of data may result in the transition of at least some of the cells to populations 172 and 176 (01 and 10, respectively). In this way, the least significant bit (LSB) of the programmed state of each cell can represent the bit values for the first page of data and the most significant bit (MSB) of the programmed state of each cell can represent the bit values for the second page of data.

In some cases, it may be determined that the decoding of different pages of memory cells (e.g., MSB v. LSB) require different recovery routines. Hence, different read error recovery tables may be formed to decode data from these respective pages. Data statistics on success and time to resolution may be accumulated and updated tables may be generated as discussed above in FIG. 9.

Figure 14:
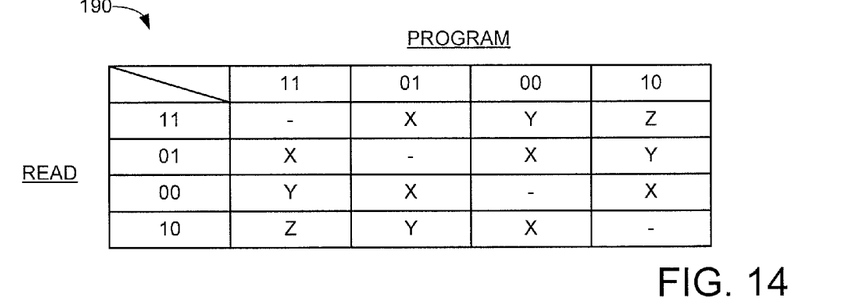
FIG. 14 is a table that illustrates different read errors for the different MLC program states of FIG. 11.

In further cases, it has been found that the decoding of different programmed values for MLCs can provide different levels of difficulty in resolving read errors. FIG. 14 provides a table 190 that correlates writing versus reading errors for different MLC programming states. The markers "X" denote simple errors that are easily resolved. The markers "Y" denote more complex errors that are harder to resolve. The markers "Z" denote severe errors that may be difficult to resolve. From table 190 it can be seen that an MLC programmed to the state "11" will most likely be sensed as the value "01," since this is the population (182 in FIG. 13) closest to the programmed population (180 in FIG. 13). On the other hand, sensing a programmed "11" as the value "00" or "10" provides increasingly more complex errors, which may imply more significant error mechanisms are at play. The values from the table 190 in FIG. 14 can be used as part of the iterative error recovery process.

Figure 15:
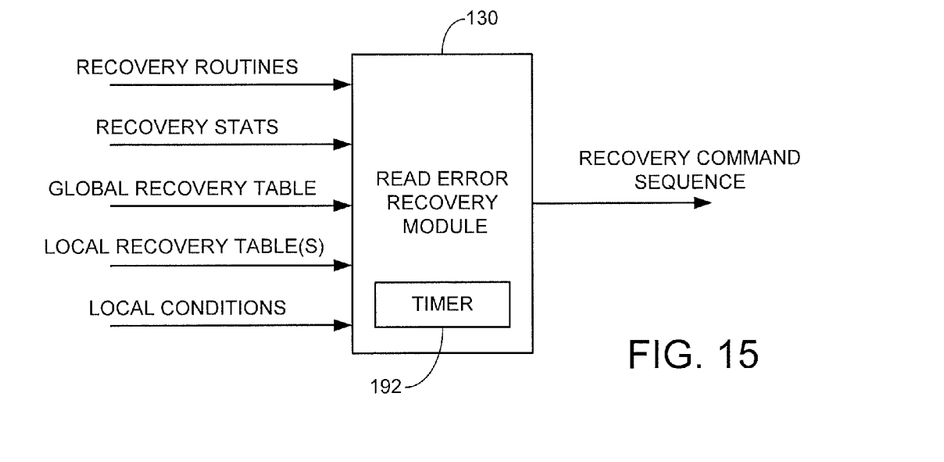
FIG. 15 depicts a number of inputs used by the read error recovery module in accordance with some embodiments.

FIG. 15 provides another representation of the read error recovery module 130 discussed herein. The module 130 is configured in FIG. 15 to direct a selected recovery command sequence for recovery of a data set having one or more uncorrected errors based on a variety of inputs. These inputs can include a set of available recovery routines and accumulated recovery statistics, a global recovery table, one or more local recovery tables, and local parametric conditions which may signify the selection of one or more of the local recovery tables in lieu of the global recovery table. A timer module 192 can be used to measure elapsed time intervals during the tracking of the success or failure of the various routines.

The foregoing embodiments can be applied by a memory module in a variety of ways. In some cases, a proactive approach can be used. For example, if a certain type of error has been found to be occurring on a regular rate in a particular section of the memory, the memory module may proactively use the read error recovery module 130 to initiate recovery of data from other areas in or adjacent that section using the read error recovery routines from the table without waiting for an uncorrectable error to be "declared" from such other areas. Thus, the "uncorrectable error" need not be from the memory address to which the read error recovery routines are being applied.

It will further be noted that the selected order of the read error recovery routines need not necessarily be known at the start of the recovery process. That is, the table can be adaptively assembled based on the progress of the recovery routines. For example, if a certain read error recovery routine is demonstrating low recovery success for a particular section of memory or over a particular time interval, that read error recovery routine may be skipped for other reads in that same section of memory or during that same time interval. These and other alternatives will readily occur to the skilled artisan in view of the present disclosure.

While various embodiments have been described in the environment of a flash memory, such is merely illustrative. The various embodiments can be readily implemented into other forms of solid-state memory including but not limited to spin-torque transfer random access memory (STRAM), resistive random access memory (RRAM), phase change random access memory (PCRAM), magnetic random access memory (MRAM), etc.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a memory comprising a plurality of solid-state non-volatile memory cells; and
a processing circuit connected to the memory and configured to direct execution of a plurality of read error recovery routines responsive to at least one uncorrectable read error in a data set retrieved from the memory, the recovery routines executed in a selected order based on an elapsed recovery time parameter for each the recovery routines and an estimated probability of success for each of the recovery routines, the processing circuit further configured to generate and store in a local memory a correction table that lists the plurality of read error recovery routines in the selected order, the processing circuit further configured to measure an elapsed time interval during which each of the read error recovery routines is executed and to record, in the local memory, an indication value indicating whether said execution was successful in correcting the at least one uncorrectable read error.

2. The apparatus of claim 1, further comprising a read circuit configured to, responsive to a read command, retrieve the data set from the memory and apply parity data to the retrieved data set in an attempt to detect and correct bit errors therein, wherein at least one uncorrectable error is present in the retrieved data set at a conclusion of the application of the parity data.

3. The apparatus of claim 2, wherein the parity data comprises error correction codes selected in relation to a measured bit error rate of data read from the memory, wherein different types of parity data are applied responsive to changes in the measured bit error rate over an operational life of the memory.

4. The apparatus of claim 1, wherein the processing circuit establishes the selected order responsive to an elapsed time interval associated with each of the plurality of read error recovery routines and a probability of success of each of the plurality of read error recovery routines.

5. The apparatus of claim 4, wherein the processing circuit subsequently rearranges the plurality of read error recovery routines into a new, different order responsive to a subsequently measured elapsed time interval associated with each of the plurality of read error recovery routines and a subsequently determined probability of success of each of the plurality of read error recovery routines.

6. The apparatus of claim 1, wherein the plurality of read error recovery routines includes a read retry routine wherein a read retry operation is carried out at least once using a baseline read threshold, a soft decode routine wherein an adjusted read threshold is applied in an attempt to decode the data set, and an iterative read data error recovery approach is applied up to a maximum number of iterations.

7. The apparatus of claim 1, wherein the correction table is a global correction table comprising a first ordering of read error recovery routines and the processing circuit further generates and stores a local correction table comprising a different, second ordering of read error recovery routines, wherein the processing circuit further applies the different, second ordering of read error recovery routines in the local correction table responsive to a second unrecoverable read error and a measured parameter associated with the memory.

8. The apparatus of claim 7, wherein the measured parameter comprises a workload associated with the memory.

9. The apparatus of claim 7, wherein the measured parameter comprises a bit placement of a page of memory in a row of memory cells.

10. The apparatus of claim 7, wherein the measured parameter comprises an address of the retrieved data set in the memory.

11. The apparatus of claim 1, wherein the memory comprises a flash memory and the processing circuit comprises a programmable processor that uses programming steps stored in a memory device to carry out the respective recovery routines.

12. A method comprising:
storing data to a memory comprising a plurality of solid-state non-volatile memory cells;
performing a read operation to subsequently retrieve the data from the memory by applying parity data to a user data payload portion of the data to detect and correct up to a selected number of errors, wherein at a conclusion of said application of the parity data at least one uncorrectable read error remains in the retrieved data; and
implementing a read error recovery routine to resolve the at least one uncorrectable read error by executing a plurality of read error recovery routines in a selected order based on an elapsed recovery time parameter to complete each of the recovery routines and an estimated probability of success of each of the recovery routines, the elapsed time recovery parameter comprising a first average time to successfully complete the associated recovery routine where a read error is successfully corrected, and a second average time to complete the associated recovery routine where said routine is unsuccessful in correcting a read error.

13. The method of claim 12, wherein the performing a read operation comprises applying error correction codes to the user data payload portion selected in relation to a measured bit error rate, wherein different strengths of the error correction codes are applied responsive to changes in the measured bit error rate over an operational life of the memory.

14. The method of claim 12, wherein the implementing a read error recovery routine comprises generating and storing, in a local memory, a correction table which lists the plurality of read error recovery routines in the selected order.

15. The method of claim 14, wherein the implementing a read error recovery routine further comprises measuring an elapsed time interval during which each of the read error recovery routines is executed and recording, in the local memory, an indication value indicating whether said execution was successful in correcting the at least one uncorrectable read error.

16. The method of claim 12, wherein the selected order is determined responsive to an elapsed time interval associated with each of the plurality of read error recovery routines and a probability of success of each of the plurality of read error recovery routines.

17. The method of claim 12, wherein the plurality of read error recovery routines includes a read retry routine wherein a read retry operation is carried out at least once, a soft decode routine wherein non-standard read thresholds are applied in an attempt to decode the data set, and an iterative read data error recovery approach is applied up to a maximum number of iterations.

18. A storage device comprising:
a memory comprising a plurality of solid-state non-volatile memory cells; and
a processing circuit connected to the memory and configured to direct execution of a plurality of read error recovery routines responsive to at least one uncorrectable read error in a data set retrieved from the memory, the recovery routines executed in a selected order based on an elapsed recovery time parameter for each the recovery routines and an estimated probability of success for each of the recovery routines, the processing circuit further configured to generate and store, in a local memory, a correction table which lists the plurality of read error recovery routines in the selected order, the processing circuit further configured to measure an elapsed time interval during which each of the read error recovery routines is executed and to record, in the local memory, an indication value indicating whether said execution was successful in correcting the at least one uncorrectable read error.

19. The storage device of claim 18, further comprising a read circuit configured to, responsive to a read command, retrieve the data set from the memory and apply parity data to the retrieved data set in an attempt to detect and correct bit errors therein, wherein at least one uncorrectable error is present in the retrieved data set at a conclusion of the application of the parity data.

20. The storage device of claim 18, wherein the solid-state non-volatile memory cells are flash memory cells.

* * * * *